(12) United States Patent
Roston et al.

(10) Patent No.: US 10,425,791 B2
(45) Date of Patent: *Sep. 24, 2019

(54) WIRELESS SENSOR DEVICE

(71) Applicant: Percev, LLC, Davenport, IA (US)

(72) Inventors: Gerald Roston, Saline, MI (US);
Andrew Zimmerman, Colorado Springs, CO (US)

(73) Assignee: Percev LLC, Davenport, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/573,861

(22) PCT Filed: Sep. 3, 2016

(86) PCT No.: PCT/US2016/050300
§ 371 (c)(1),
(2) Date: Nov. 14, 2017

(87) PCT Pub. No.: WO2017/041060
PCT Pub. Date: Mar. 9, 2017

(65) Prior Publication Data
US 2018/0262890 A1    Sep. 13, 2018

Related U.S. Application Data

(63) Continuation of application No. 14/938,198, filed on Nov. 11, 2015, now Pat. No. 9,848,280, which is a continuation-in-part of application No. 14/938,198.
(Continued)

(51) Int. Cl.
*H04W 4/70* (2018.01)
*H04W 52/02* (2009.01)

(52) U.S. Cl.
CPC ......... *H04W 4/70* (2018.02); *H04W 52/0251* (2013.01); *Y02D 70/142* (2018.01); *Y02D 70/22* (2018.01)

(58) Field of Classification Search
CPC ... H04W 4/70; H04W 52/0251; H04W 84/18; H04L 67/12; H04L 69/08; H04L 12/2825;
(Continued)

(56) References Cited

U.S. PATENT DOCUMENTS 9,848,280 B2 * 12/2017 Zimmerman ......... H04W 4/70
2010/0007529 A1 *  1/2010 Urata .................... G06F 3/0346
                                                               341/20

(Continued)

*Primary Examiner* — Paul H Masur
*Assistant Examiner* — Michael K Phillips
(74) *Attorney, Agent, or Firm* — Black, McCuskey, Souers & Arbaugh LPA

(57) ABSTRACT

A wireless sensor device can include a primary body, a primary processor mounted to the primary body, a first plurality of sockets mounted to the primary body and in electrical communication with the primary processor, a first transducer mounted to the primary body, a secondary body mounted to the primary body through a first socket of the first plurality of sockets, a secondary processor mounted to the secondary body, a second plurality of sockets mounted to the secondary body and disposed in electrical communication with the secondary processor, a tertiary body mounted to the secondary body, a tertiary transducer mounted to the tertiary body and disposed in electrical communication with the secondary processor, and a first wireless transceiver disposed in electrical communication with and selectively controlled by the primary processor.

21 Claims, 7 Drawing Sheets

Related U.S. Application Data

(60) Provisional application No. 62/213,836, filed on Sep. 3, 2015, provisional application No. 62/327,000, filed on Apr. 25, 2016.

(58) Field of Classification Search
CPC .... A61B 5/0002; Y02D 70/00; Y02D 70/142; Y02D 70/22
See application file for complete search history.

(56) References Cited

U.S. PATENT DOCUMENTS

| | | | | |
|---|---|---|---|---|
| 2011/0021930 A1* | 1/2011 | Mazzeo | ................ | A61B 5/0002 600/485 |
| 2011/0271013 A1* | 11/2011 | Inoue | .................... | G06F 3/0346 710/14 |
| 2017/0049298 A1* | 2/2017 | Hunter | .................... | A61B 1/005 |

* cited by examiner ary processor, a second plurality of sockets, a tertiary body, a tertiary transducer, and a first wireless transceiver. The primary processor can be mounted to the primary body. The first plurality of sockets can be mounted to the primary body and can be disposed in electrical communication with the primary processor. The first transducer can be releasably mounted to the primary body through a first socket of the first plurality of sockets. The secondary body can be releasably mounted to the primary body through a second socket of the first plurality
WIRELESS SENSOR DEVICE

CROSS-REFERENCE TO RELATED APPLICATIONS

This application is a continuation-in-part of Ser. No. 14/938,198 for WIRELESS SENSOR DEVICE, filed on 11 Nov. 2015, and also claims the benefit of U.S. Provisional Patent Application Ser. No. 62/213,836 for SYSTEMS AND METHODS FOR PROCESSING REAL-TIME SENSOR DATA, filed on 3 Sep. 2015, and also claims the benefit of U.S. Provisional Patent Application Ser. No. 62/327,000 for a WIRELESS SENSOR DEVICE, filed 25 Apr. 2016, this application is also a national phase filing claiming priority to PCT/US2016/050300 for WIRELESS SENSOR MODULE, all are hereby incorporated by reference in their entireties.

BACKGROUND

1. Field

The present invention relates to processing real-time transducer data for the purpose of reducing the amount of information to be transmitted.

2. Description of Related Prior Art

The advent of highly capable microcontrollers, high energy density batteries, and ubiquitous cloud-computing has spawned a new age—the age of the Internet of Things (IoT). One application for IoT is the monitoring of various systems, from people to machines. A typical scenario involves outfitting the object to be monitored with sensors and having these sensors communicate, typically wirelessly, either directly to the cloud or via a gateway to the cloud. Once the data are in the cloud, various computational processes can be applied to the data to provide information to users.

As valuable as this new paradigm is, there are significant shortcomings with existing products and technologies that address the markets' needs.

What is needed is a low cost, extensible, sensing system that accommodates low power stream processing modules that can operate on real-time transducer data and extract information from them.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A wireless sensor device can include a primary body, a primary processor, a first plurality of sockets, a first transducer, a secondary body, a secondary processor, a second plurality of sockets, a tertiary body, a tertiary transducer, and a first wireless transceiver. The primary processor can be mounted to the primary body. The first plurality of sockets can be mounted to the primary body and can be disposed in electrical communication with the primary processor. The first transducer can be releasably mounted to the primary body through a first socket of the first plurality of sockets. The secondary body can be releasably mounted to the primary body through a second socket of the first plurality of sockets. The secondary processor can be mounted to the secondary body. The primary processor and the secondary processor can be disposed in electrical communication with one another through the second socket and can be operating asynchronously. The primary processor can be configured to direct the electrical signals generated by the first transducer to the secondary processor. The secondary processor is configured to process the electrical signals generated by the first transducer independently of the primary processor and selectively communicate output to the primary processor. The second plurality of sockets can be mounted to the secondary body and can be disposed in electrical communication with the secondary processor. The tertiary body can be releasibly mounted to the secondary body. The tertiary transducer can be mounted to the tertiary body and disposed in electrical communication with the secondary processor through a first socket of the second plurality of sockets. The first wireless transceiver can be disposed in electrical communication with and controlled by the primary processor. The first wireless transceiver can be configured to be selectively controlled by the primary processor independently of the secondary processor.

BRIEF DESCRIPTION OF THE DRAWINGS

The detailed description set forth below references the following drawings.

DETAILED DESCRIPTION

Figure 1:
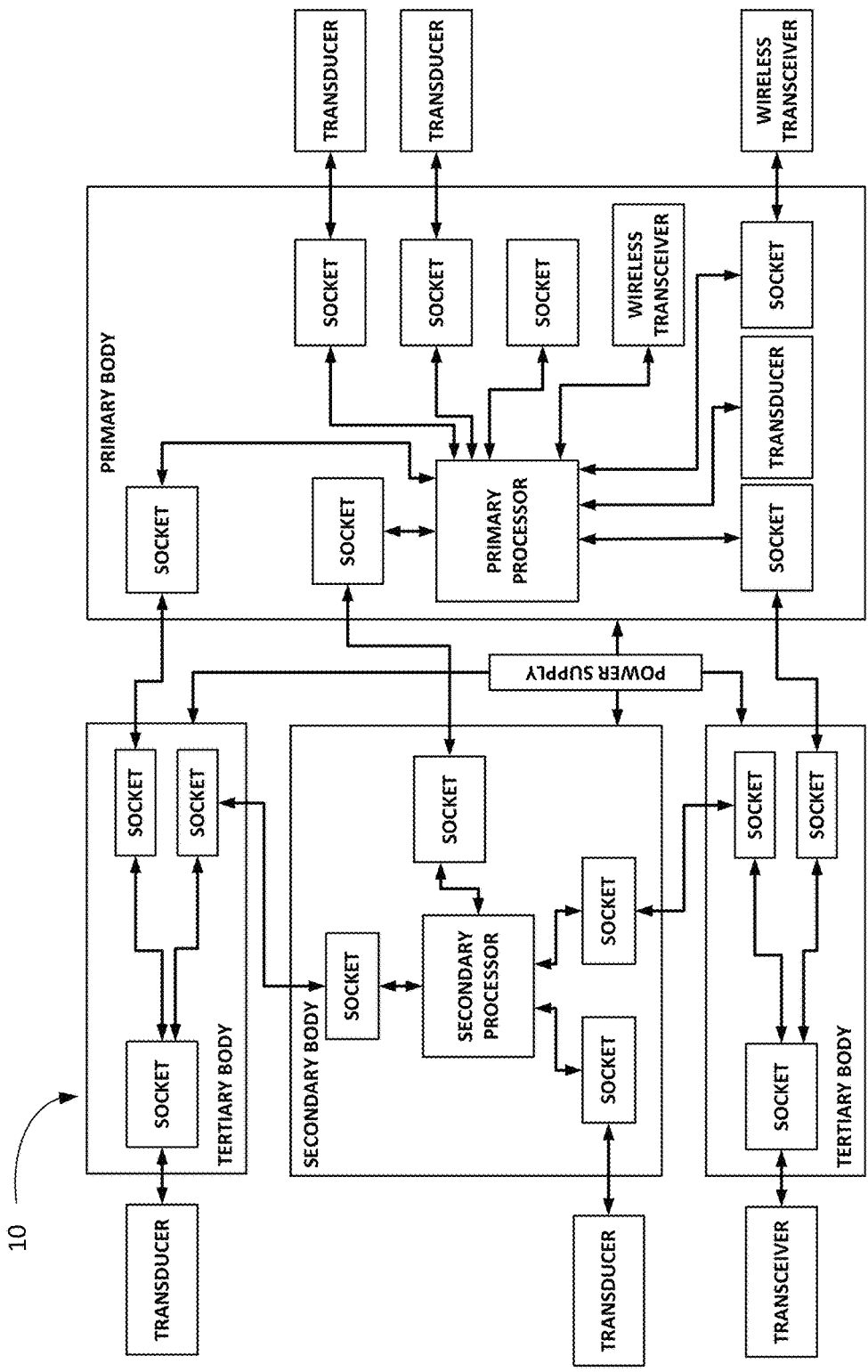
FIG. 1 is a schematic of a wireless sensor device according to a first exemplary embodiment of the present disclosure.

The following description is merely exemplary in nature and is not intended to limit the present disclosure, application, or uses. It should also be understood that throughout the reference numerals indicate like or corresponding parts and features. In respect of the methods disclosed, the order of the steps presented is exemplary in nature, and thus, is not necessary or critical, unless otherwise noted. In addition, while much of the present invention is illustrated using specific examples, the present invention is not limited to these embodiments. All publications, patent applications, patents, and other references mentioned herein are incorporated by reference in their entireties. In case of conflict, the present specification, including definitions, will control.

The following definitions apply to certain terms used in the specification:

Body: A device, typically a circuit board with attendant circuitry that extends the functionality of a wireless sensor device.

Cloud (and similarly cloud-based computing, cloud computing, etc.): A network of computers that is generally accessible to computers not comprising the cloud.

Computer: Any electronic computing device. Examples span the gamut from single chip, 8-bit microcontrollers to 1000-plus node super computers.

Socket: An interface that provides both mechanical and electrical connectivity between two bodies. Electrical connectivity may include signal conditioning, switching, and/or other circuitry normally associated with microcontroller systems and sensor systems.

Releasibly mounted: A means of coupling two bodies together via a socket that can be operated without the need for specialized assistive tooling.

Process: The act, by a computer, of performing algorithmic functions.

Stream process: A type of processing wherein at least one input to the algorithm is a flow of transducer data being acquired in real-time.

Transducer: A device which converts a first physical quantity into a second physical quantity. Examples of first physical quantities include temperature (thermometer), vibration (accelerometer), varying air pressure (microphone), photonic patterns (video camera), molecular detectors ($CO_2$ sensor), etc. Typically, the second physical quantity is electricity with specified conditions that are easily interpreted by a computer.

Transducer data: For clarity, there are two stages of transducer data: raw transducer data is the output from a transducer; interpreted transducer data is the result of digitizing raw transducer data by a computer.

The inventors have perceived that one problem associated with the monitoring systems relates to the lack of an integrated architecture. There exists a popular class of devices that fall under the Arduino label. These are small, low-cost single board computers to which a variety of peripherals can be attached. The problem with these devices is that the user has to develop the entire system from the ground up—there are no systems in place placed on this architecture.

Other systems require a separate transducer interface device for each deployed transducer. Examples include the MicroStrain line of products from Lord. Most of their products, which typically cost $650 and up, support but a single transducer. Thus, to outfit a capital asset with multiple transducers is expensive and potentially challenging, due to the need to emplace multiple transducer interface devices. Having multiple transducer interface devices also means that multiple power sources are needed.

Many systems, such as the MicroStrain line of products, require a special device to serve as a gateway between the wireless transducer interface devices and the cloud. The need for such a gateway further increases system cost as these gateways do not have the capability to interface with transducers directly.

While the above cited shortcomings make it difficult and/or expensive to deploy wireless sensing systems, the biggest drawback with all existing wireless sensing systems is that they lack on-board processing capabilities. What this means is that they are required to transmit raw data to the cloud. As an example, for the application of machinery health monitoring, if the manner in which the machine vibrates is the critical parameter being monitored, one typically outfits the machine with accelerometers and typically samples them at ten times the frequency of interest. To extract the frequency from the raw acceleration data, one typically needs thousands of samples, each typically two bytes in size. Since the actual frequency itself can typically be stored as a four byte value, if one were to perform the frequency extraction not in the node, the number of bytes that would need to be transmitted is several thousand times greater than just transmitting the frequency. To transmit these data to the cloud, when taking into account various overheads associated with creating intelligible data blocks, packet headers, etc., requires on the order of 3000+ bytes of data per second. However, the actual amount of information being transmitted is on the order of several bytes, i.e., far less than one percent of the amount of data that would otherwise be transmitted.

This excessive data transmission has a significant impact on energy consumption. Specifically, the amount of energy needed to transmit the data is typically orders of magnitude greater than the amount of energy needed to perform the data analyses on-board to extract the required information. For small, low-cost wireless systems, where only limited battery energy is available, the extra energy needed to transmit the data can make an application untenable due to the need to regularly replace the battery.

Another drawback to systems that lack on-board processing is that they necessarily transmit each data point that it gathered. However, if the physical process being measured does not change, no new information is delivered by repeatedly transmitting the same data value. Other than a periodic transmission to let the cloud know that a sensor is still functional, energy can be conserved by only transmitting a data point when its value changes. This means of intelligent data management is easily handled by an on-board processor.

This excessive data transmission also has a significant impact on data storage. Specifically, by transmitting raw data, as opposed to processing the data and transmitting just the information contained within said data, one requires orders of magnitude more storage capacity than actually needed. This leads to data glut, higher costs, slower data retrieval times, and other similar problems.

FIG. 1 is a schematic of a wireless sensor device 10 according to an exemplary embodiment of the present disclosure. A wireless sensor device comprises, in one or more embodiments of the present disclosure, a primary processor affixed to a primary body; a first transducer in electrical communication with the primary processor that is either affixed to the primary body or connected to the primary body by means of a socket; and a transceiver in electrical communication with the primary processor that is either affixed to the primary body or connected to the primary body by means of a socket.

An aspect of the wireless sensor device 10 is that a plurality of wireless sensor devices 10 may form a mesh network. Having the wireless sensor devices 10 form a mesh network provides several important benefits: only a subset of them needs to have the ability to communicate with the cloud; computing resources can be shared; and patterns can be more sophisticated. These benefits lead to both reduced cost and increased robustness as redundancy can be easily incorporated into the system design.

The wireless sensor device 10 can include one or more bodies. The wireless sensor device 10 can provide one or more interfaces to bodies, thereby enhancing the flexibility of the system while providing the means of minimizing cost. Bodies may be releasibly connected to the primary body by way of sockets.

For example, one such set of bodies are transducer interface bodies. Said transducer interface bodies run the gamut from very simple to very complex. For example, a simple transducer interface body may comprise a voltage divider network for interfacing with a thermistor. For example, a sophisticated transducer interface body may comprise a dedicated microcontroller for managing a camera. It is typically the case that the transducer interface body presents a common interface to the primary processor in order to allow the primary processor to easily acquire transducer data from all transducer interface bodies.

An aspect of the architecture of the wireless sensor device 10 is the separation of processing capability between a primary processor and a secondary processor. For example, the secondary processor can provide stream processing functionality. One might configure a wireless sensor device 10 in this manner since managing a real time sensor node requires precise timing control between various events, especially in those embodiments that include a mesh network, because coordination between the nodes requires that they transmit/receive at known times. Thus, requiring the primary processor, which typically manages these timed events, to also stream process sensor data is challenging as the additional code has to work within the confines of the rigidly imposed timing constraints.

Since not all applications of a wireless sensor device 10 require a secondary processor, a cost effective approach for providing such a secondary processor is for said secondary processor to be optionally included in a wireless sensor device 10. In one embodiment, a body may comprise a secondary processor affixed to a secondary body which may be releasibly connected to the primary body via a socket. In certain application, it may be advantageous for a wireless sensor device 10 to include multiple secondary bodies with their attendant secondary processors.

The means of communication between the primary processor and the secondary processor can be a standard digital interface, such as USART, SPI, or I²C, which means that the two processors are loosely coupled. In an embodiment, the primary processor can direct the secondary processor to act on a block of data and when the processing is done, the secondary processor can interrupt the primary processor to let it know that the results are ready. Since transducer interface bodies typically operate in a similar manner, the secondary processor can appear to the primary processor as another sensor, thereby greatly simplifying the task of managing the data outputted by the secondary processor.

More specifically, the secondary processor can be connected to the primary processor via at least one commonly available digital interface (USART, SPI, I²C, etc). Buffered direct memory access (DMA) on both processors can be used to abstract inter-processor communications from the primary processor to minimize interruption of core system functionality for the sake of communication. In general, the secondary processor can be a slave to the primary processor and all communication between processors will be initiated by the primary processor. However, the architecture can be configured to allow communications to be initiated by the secondary processor as well. In certain embodiments, an overarching system objective is minimizing energy consumption and in such cases it is desirable to have both processors sleep as deeply as possible as often as possible; and as such it is not desirable to have communications channels open all of the time. As a result, a single I/O line can be exposed that allows the primary processor to wake up the secondary processor from a deep sleep via an asynchronous interrupt. A second I/O line could be used in the opposite direction in some cases where it is advantageous for the secondary processor to have the ability to wake up the primary processor (e.g. if the secondary processor is performing autonomous tasks and detects a problem with the monitored system that demands immediate attention).

The primary processor to secondary processor relationship can be defined in multiple manners. For example, in one manner, the secondary processor can begin its life in a sleep state, and only wakes up to perform a task when the primary processor deems it necessary. Results of this task can then be buffered and communicated back to the primary processor when requested. In another manner, the secondary processor is configured by the user to wake itself up periodically to perform a task and buffer the processed results. These results can then be periodically communicated back to the primary processor when requested.

In certain embodiments, the secondary processor may stream process real-time transducer data. For example, the second processor may be provided a real-time stream of transducer data, such as acceleration data from a three-axis accelerometer at 200 (or more) samples per second, and may perform calculations, such as a Fast Fourier algorithm, on said data stream to reduce the 200 (or more) samples per second to a single value, e.g., the dominant frequency.

The output of the secondary processor can be a numerical value. The primary processor can be configured to selectively transmit the output of the secondary processor through a wireless transceiver only in response the numerical value changing a predetermined amount. For example, if the secondary processor is monitoring a physical process and a numerical value associated with the physical process being measured does not change, no new information need be delivered to avoid repeatedly transmitting the same data value. Other than a periodic transmission to let the cloud know that a sensor is still functional, energy can be conserved by only transmitting a data point when its value changes so predetermined amount. This means of intelligent data management is easily handled by an on-board processor.

From a data processing perspective, there are multiple distinct architectures that can be considered. For example, in one architecture, the primary processor handles the data acquisition tasks, with transducer data being provided to the primary processor from transducers that are electrically connected to transducer interface bodies that are releasibly connected to the primary body, and passes collected sensor data to the secondary processor for processing. In another architecture, the secondary processor performs its data acquisition tasks independently from the primary processor, and processes this data after it is collected independently of the primary processor. Results are communicated back to the primary processor upon request.

In addition to receiving sensor data from the primary processor, or equivalently, a pointer to one or more blocks of sensor data, a secondary processor may also include transducer interface functionality, thereby allowing it to directly interrogate sensors. In such cases, the secondary processor may perform data acquisition tasks with transducer data being provided to the secondary processor from transducers interface bodies that are releasibly connected to sockets affixed to the secondary body, The secondary processor may operate on either data provided by the primary processor, data it acquires itself, or any combination thereof.

The most costly and complex components of a secondary body are typically the secondary processor and the hardware associated with it, such as external memory, data communication lines, etc. Further, there are a wide variety of transducers with which one may wish to have a secondary processor communicate directly. Thus, it is beneficial to provide one or more tertiary bodies, which are in electrical communication with a secondary body, in order to have a single or common interface that can communicate with a variety of transducers. For example, in one embodiment, a tertiary body could include conditioning circuitry for interfacing with a rosette of strain gauges and in another embodiment, a tertiary body could contain circuitry for interfacing with an accelerometer. By placing this interface circuity on the tertiary body, a wider variety of interfaces can be enabled at lower cost all while maintaining a compact footprint.

A tertiary body is a special type of transducer interface body. What differentiates it from other transducer interface bodies is that transducers that are releasibly connected to the tertiary body by way of a socket can be directly accessed by either the primary processor or a secondary processor. To avoid conflicts, a tertiary body may include a means to control which of the processors can communicate with the attached transducer(s). An approach is to use a jumper on a tertiary body that enables access to the primary or secondary processor. Another approach is to use an electrically actuated switch that is controlled by either the primary or secondary processor to enable access to the primary or secondary processor.

In certain embodiments, the secondary processor may directly communicate with the one or more radios found in the wireless sensor device 10. FIG. 1 shows a first transceiver mounted on the primary body and a second transceiver releasibly connected to the primary body by way of a socket. In one or more embodiments of the present disclosure, the primary processor can control the first transceiver exclusively and also be operable to selectively control the second transceiver. Alternatively, the secondary processor can be operable to selectively control the first transceiver or the second transceiver.

In one or more embodiments, it may be desirable to include a third transceiver, the operation of which requires additional computation for its control. For example, a wireless sensor device 10 may be configured to communicate with cloud-based resources via a wireless connection and with machine control computers (PLCs) via a wired connection, with the wired connection being required to support both TCP/IP and Ethernet/IP protocols.

An approach for providing this third transceiver is to outfit a tertiary body with a socket, thereby allowing said third transceiver to be releasibly connected to the tertiary body and thereby enabling control of said third transceiver by a secondary processor. Having the third transceiver releasibly connected to a tertiary body further allows the primary processor to control the third transceiver.

The primary body, secondary body, and certain tertiary bodies require electrical power to carry out their functions. In an embodiment, power is provided to each of these bodies via a connection from a power supply. In an embodiment, power is provided to the primary body with a connection from a power supply, and power to the secondary and tertiary bodies is provided via either a connection from a power supply or via the releasable connection that exists between the bodies.

Another aspect of the wireless sensor device 10 is that each one need not contain the same suite of transducers, have the same number of radios, or perform the same computational tasks as others in the same mesh network. This aspect further provides for reducing overall system cost.

A wireless sensor device 10 can be further configured to receive software updates via either the first transceiver and/or a second transceiver and/or a third transceiver. Upon receiving such a software update, the wireless sensor device 10 would reprogram itself using said software update. This capability provides great utility as it allows users to fix problems and/or add new capabilities without having to physically access each deployed wireless sensor device 10.

Each wireless sensor device 10 can be identified by a globally unique identifier. Communications between a wireless sensor device 10 and the cloud may be encrypted. In an embodiment, said encryption makes use of public-key/private-key encoding and uses said globally unique identifier as the private key.

Figure 2:
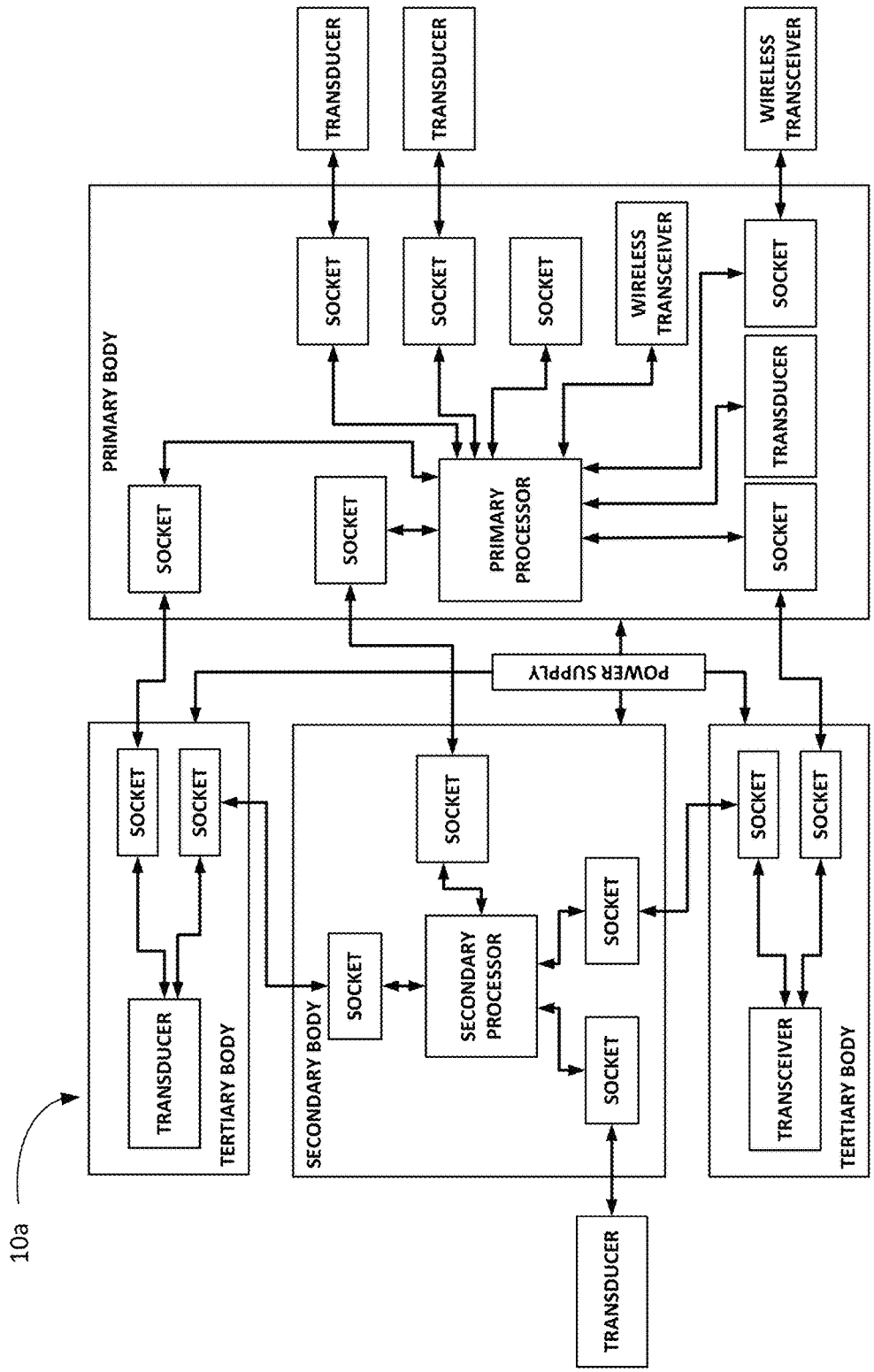
FIG. 2 is a schematic of a wireless sensor device according to a second exemplary embodiment of the present disclosure.

FIG. 2 is a schematic of a wireless sensor device 10a according to another exemplary embodiment of the present disclosure. The wireless sensor 10a device comprises a primary processor affixed to a primary body; a first transducer in electrical communication with the primary processor that is either affixed to the primary body or connected to the primary body by means of a socket; and a transceiver in electrical communication with the primary processor that is either affixed to the primary body or connected to the primary body by means of a socket.

The wireless sensor device 10a can include one or more bodies. The wireless sensor device 10a can provide one or more interfaces to bodies, thereby enhancing the flexibility of the system while providing the means of minimizing cost. Bodies may be releasibly connected to the primary body by way of sockets.

For example, one such set of bodies are transducer interface bodies. Said transducer interface bodies run the gamut from very simple to very complex. For example, a simple transducer interface body may comprise a voltage divider network for interfacing with a thermistor. For example, a sophisticated transducer interface body may comprise a dedicated microcontroller for managing a camera. It is typically the case that the transducer interface body presents a common interface to the primary processor in order to allow the primary processor to easily acquire transducer data from all transducer interface bodies.

An aspect of the architecture of the wireless sensor device 10a is the separation of processing capability between a primary processor and a secondary processor. For example, the secondary processor can provide stream processing functionality. One might configure a wireless sensor device 10a in this manner since managing a real time sensor node requires precise timing control between various events, especially in those embodiments that include a mesh network, because coordination between the nodes requires that they transmit/receive at known times. Thus, requiring the primary processor, which typically manages these timed events, to also stream process sensor data is challenging as the additional code has to work within the confines of the rigidly imposed timing constraints.

Since not all applications of a wireless sensor device 10a require a secondary processor, a cost effective approach for providing such a secondary processor is for said secondary processor to be optionally included in a wireless sensor device 10a. In one embodiment, a body may comprise a secondary processor affixed to a secondary body which may be releasibly connected to the primary body via a socket. In certain application, it may be advantageous for a wireless sensor device 10 to include multiple secondary bodies with their attendant secondary processors.

In addition to receiving sensor data from the primary processor, or equivalently, a pointer to one or more blocks of sensor data, a secondary processor may also include transducer interface functionality, thereby allowing it to directly interrogate sensors. In such cases, the secondary processor may perform data acquisition tasks with transducer data being provided to the secondary processor from transducers interface bodies that are releasibly connected to sockets affixed to the secondary body, The secondary processor may operate on either data provided by the primary processor, data it acquires itself, or any combination thereof.

The most costly and complex components of a secondary body are typically the secondary processor and the hardware associated with it, such as external memory, data communication lines, etc. Further, there are a wide variety of transducers with which one may wish to have a secondary processor communicate directly. Thus, it is beneficial to provide one or more tertiary bodies, which are in electrical communication with a secondary body, in order to have a single interface that can communicate with a variety of transducers. For example, in one embodiment, a tertiary body could include conditioning circuitry for interfacing with a rosette of strain gauges and in another embodiment, a tertiary body could contain circuitry for interfacing with an accelerometer. By placing this interface circuity on the tertiary body, a wider variety of interfaces can be enabled at lower cost all while maintaining a compact footprint. Tertiary bodies can include a releasibly-mounted transducer as shown in FIG. 1 or a fixedly-mounted transducer as shown in FIG. 2.

A tertiary body is a special type of transducer interface body. What differentiates it from other transducer interface bodies is that transducers that are affixed to the tertiary body can be directly accessed by either the primary processor or a secondary processor. To avoid conflicts, a tertiary body may include a means to control which of the processors can communicate with the attached transducer(s). An approach is to use a jumper on a tertiary body that enables access to the primary or secondary processor. An approach is to use an electrically actuated switch that is controlled by either the primary or secondary processor to enable access to the primary or secondary processor.

In certain embodiments, the secondary processor may directly communicate with the one or more radios found in the wireless sensor device 10a. FIG. 2 shows a first transceiver mounted on the primary body and a second transceiver releasibly connected to the primary body by way of a socket. In one or more embodiments of the present disclosure, the primary processor can control the first transceiver exclusively and also be operable to selectively control the second transceiver. The secondary processor can be operable to selectively control the first transceiver or the second transceiver.

In certain embodiment, it may be desirable to include a third transceiver, the operation of which requires additional computation for its control. For example, a wireless sensor device 10a may be configured to communicate with cloud-based resources via a wireless connection and with machine control computers (PLCs) via a wired connection, with the wired connection being required to support both TCP/IP and Ethernet/IP protocols.

An approach for providing this third transceiver is to affix said third transceiver to a tertiary body, thereby enabling control of said third transceiver by a secondary processor via the commonly defined interface. Having the third transceiver affixed to a tertiary body further allows the primary processor to control the third transceiver.

The primary body, secondary body, and certain tertiary bodies require electrical power to carry out their functions. In an embodiment, power is provided to each of these bodies via a connection from a power supply. In an embodiment, power is provided to the primary body with a connection from a power supply, and power to the secondary and tertiary bodies is provided via either a connection from a power supply or via the releasable connection that exists between the bodies.

Another aspect of the wireless sensor device 10a is that each one need not contain the same suite of transducers, have the same number of radios, or perform the same computational tasks as others in the same mesh network. This aspect further provides for reducing overall system cost.

Figure 3:
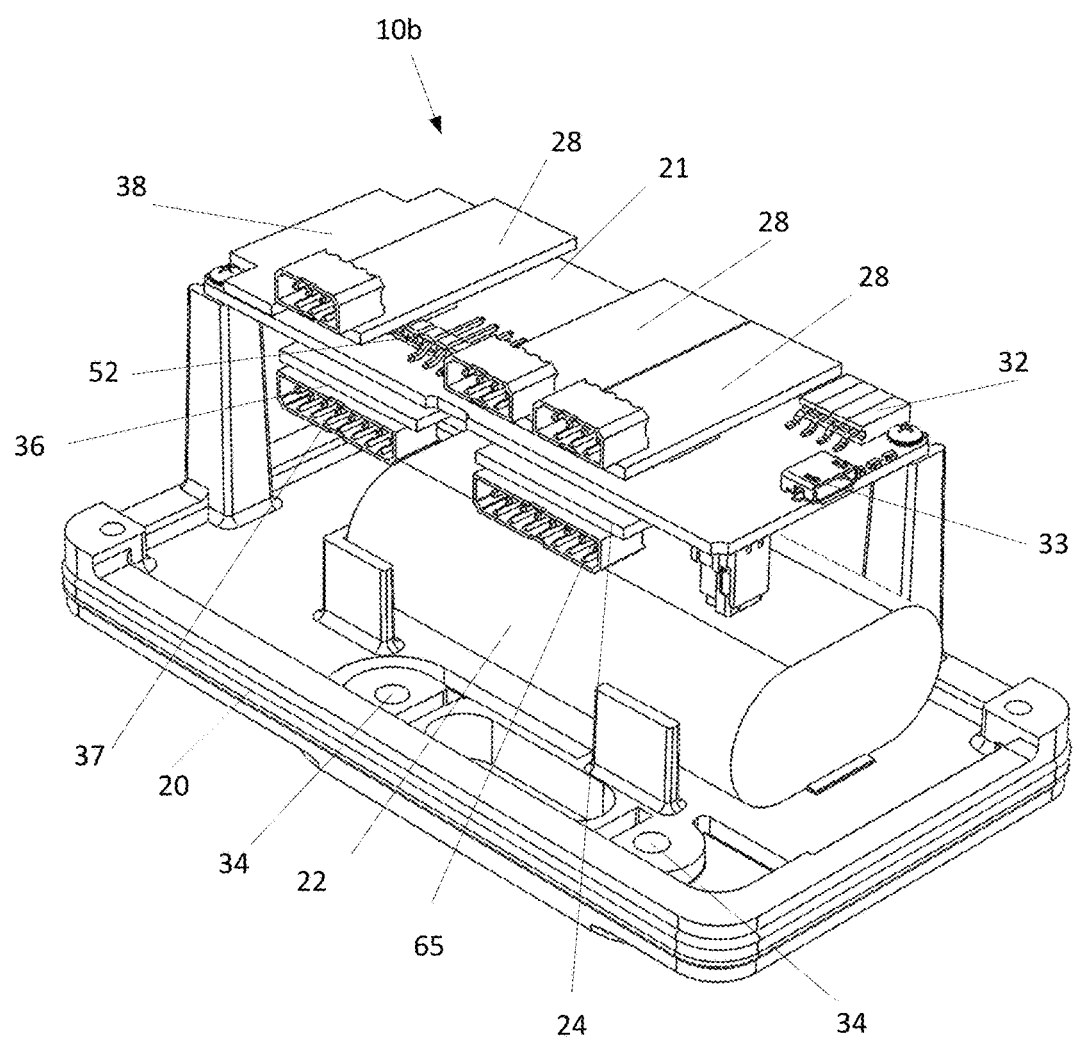
FIG. 3 is a perspective view of a wireless sensor device according to the first exemplary embodiment of the present disclosure.

FIG. 3 is a perspective view of an exemplary wireless sensor device 10b. A primary body 21 may be packaged within an enclosure 20, the cover of which is omitted to reveal the internal structures of the wireless sensor device 10b. The exemplary primary body 21 is a circuit board. Features 34 can be defined on the enclosure 20 for affixing the enclosure 20 to a structure in the operating environment. The wireless sensor device 10b can include a first wireless transceiver body 38 having a radio and configured for forming a mesh network. The wireless sensor device 10b can also include power conditioning circuitry and other components as desired. In one or more embodiments, the electronics can be structured using a modular method. A plurality of sockets, such as on socket referenced generally at 52, can be mounted on the primary body 21 for incorporating additional transducer interface bodies. Transducer interface bodies are referenced at 28 and are shown mounted to the primary body 21 of the wireless sensor device 10b for placing one or more transducers in electrical communication with the primary processor mounted on the primary body 21. A secondary processor can be mounted on a secondary body 24 that is connected to the primary body 21 via a socket similar to visible socket 52. The computational engine that powers the secondary processor may be of the same or different family or type as the processor that powers the primary processor mounted on the primary body 21. In a less preferred embodiment, the secondary body 24 may include a socket 65 for releasibly connecting transducers directly to the secondary body 24.

A tertiary body 36 may be releasibly mounted to the secondary body 24. The tertiary body 36 may include conditioning circuitry for interfacing with transducers by way of a socket 37. The tertiary body 36 may include circuitry for interfacing with transceivers by way of a socket 37.

In an embodiment, the tertiary body 36 may be releasibly mounted to the primary body 21 via a socket, such as a socket similar to the socket 52. The affixment to the primary body 21 may serve one or more of: providing mechanical support, providing electrical power, and providing control. In an embodiment, the tertiary body 36 may be controlled by the primary body 21, the secondary body 24, or both. This allows a tertiary body 36 to be used in applications for which the additional processing capabilities of secondary body 24 are needed and for those where they are not.

Any computing hardware can be used for the primary and secondary processors. Preferred hardware are those processors that are compact in size, offer integrated I/O capabilities, draw little power, and are low cost. An exemplary primary processor is an Atmel ATXMEGA128A3U, which provides 50 general purpose I/O lines, two analog-to-digital converters, one digital-to-analog converter, and several digital interfaces. This processor draws less than 15 mA when operating at full speed and less than 1 µA when in power-save mode. In moderate quantities, this processor costs less than $3.00 apiece. For cases in which the secondary processor is performing general purpose computing, an exemplary secondary processor is an Atmel ATXMEGA128A3U. For cases in which the secondary processor is performing stream processing, an exemplary secondary processor is an Atmel ATUC128L3U, which provides 32 bit processing, fixed point DSP support, dual port SRAM, and other features to facilitate data processing. This processor draws approximately 15 mA when operating at full speed and less than 7 µA when in power-save mode. In moderate quantities, this processor costs less than $8.00 apiece.

In addition to operating on data received from the transducer interface bodies 28, the primary processor and secondary processor may act on internally generated data. For example, either processor may monitor the battery 22 voltage and send a message when said voltage falls below a specified set point. Similarly, the primary processor and secondary processor may act on the strength of radio signals received by either the first wireless transceiver 38 and/or an additional transceiver and report these values to the systems' users.

The wireless sensor device 10b can also include a socket/connectors such as 32 and 33 for programming and/or accepting external power. In an embodiment, multiple sockets such as 32 and 33 can be provided.

The wireless sensor device 10b can also include an output-type transducer interface card, wherein said card is used to send a signal to an external device. Said output signals would typically be routed through one of the plurality of sockets 52. Secondary body 24 can also include an output-type transducer interface that is used to send a signal to an external device. Tertiary body 36 can also include an output-type transducer interface that is used to send a signal to an external device. The signal to an external device would typically be created via the processing done by the primary processor and/or the secondary processor.

In an embodiment, the wireless sensor device 10b can be powered from wall outlets that are supplied by the power grid. Since grid failures occur regularly, and since incidents of interest could occur during a power outage, in an embodiment, one or more battery 22 can be used to provide backup power to the wireless sensor device 10b. In other embodiments, battery 22 can be the sole source of power for the wireless sensor device 10b. In other embodiments, battery 22 can be the sole source of power for some of the components of the wireless sensor device 10b and other sources of power can be used for the remaining components of the wireless sensor device 10b.

The operating voltage of the battery 22 typically depends on the voltage needs of the processor(s) and transducer(s). In certain applications, typically AA size batteries can be used, either primary cells (alkaline) or secondary cells (NiMH). In other applications, a higher operating voltage may be desirable. In such cases, lithium ion batteries, such as Tenergy 18650 may be used. In certain cases for which minimizing the size of the enclosure 20 is desirable, coin cells, such as CR2022 may be used.

The size of the enclosure 20 is typically determined by the size and quantity of components housed there within. For the exemplary wireless sensor device 10b shown in FIG. 3, which houses the primary body 21, the secondary body 24, the tertiary body 36, up to four transducer interface bodies 28, and the battery 22, in an environmentally protected manner, the approximate size of enclosure 20 is 12 cm×7 cm×5 cm. An enclosure with similar capacity for components, but that does not provide environmental protection and ruggedness has an approximate size of 10 cm×5 cm×4 cm. An enclosure with the primary body 21, up to two transducer interfaces bodies 28, and a battery (coin-type) designed for compactness has an approximate size of 4 cm×4 cm×2 cm.

Figure 4:
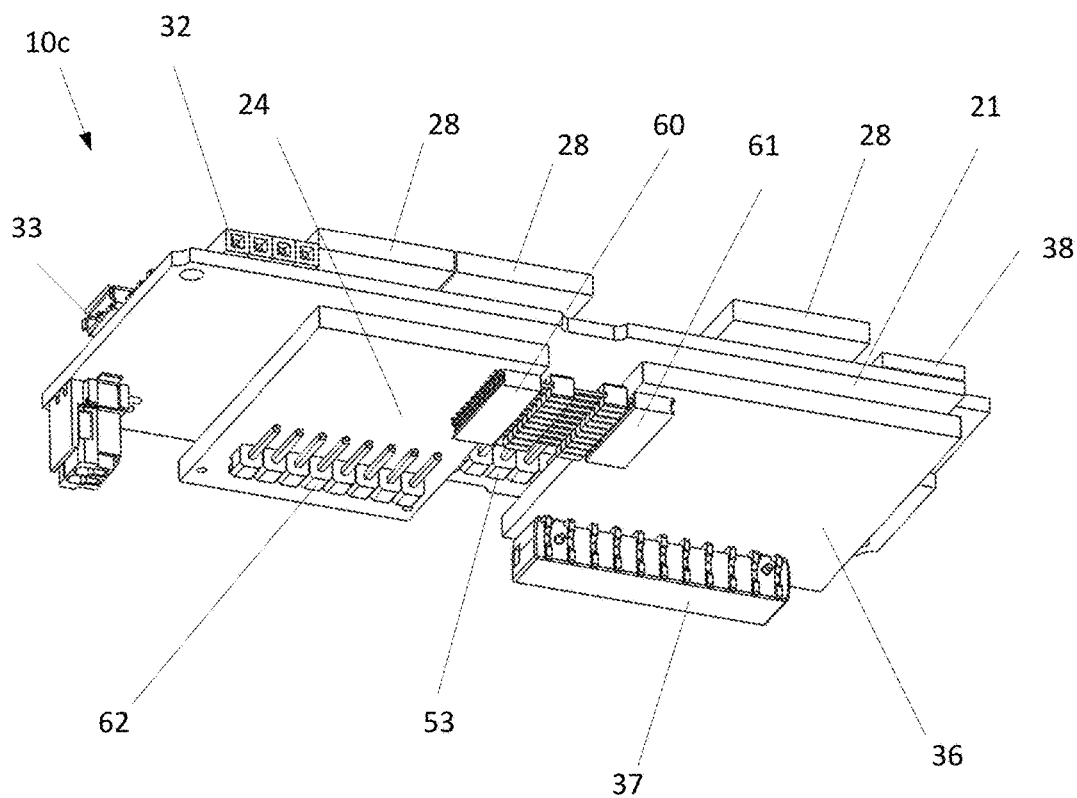
FIG. 4 is a second perspective view of the wireless sensor device shown in FIG. 3.

FIG. 4 is a second perspective view of the exemplary wireless sensor device 10c. A socket 60 on the secondary body and a socket 61 on the tertiary body 36 cooperate to provide a releasable connection between the secondary body 24 and the tertiary body 36. Either of the sockets 60 or 62 can be one of a second plurality of sockets mounted on the secondary body 24. Each of the various second plurality of sockets can provide an interface to one or more tertiary bodies. In general, the sockets 60, 62 will be sized and placed such that it will not interfere with the placement of the secondary body 24 or the tertiary body 36 relative to one another and to the primary body 21. It is noted that one or more sockets 37 can be mounted on the tertiary body 36 and can each can provide communication with a tertiary transducer. FIG. 4 also shows a socket 53 mounted on the underside of the primary body 21 for possible interconnection with another body.

Figure 5:
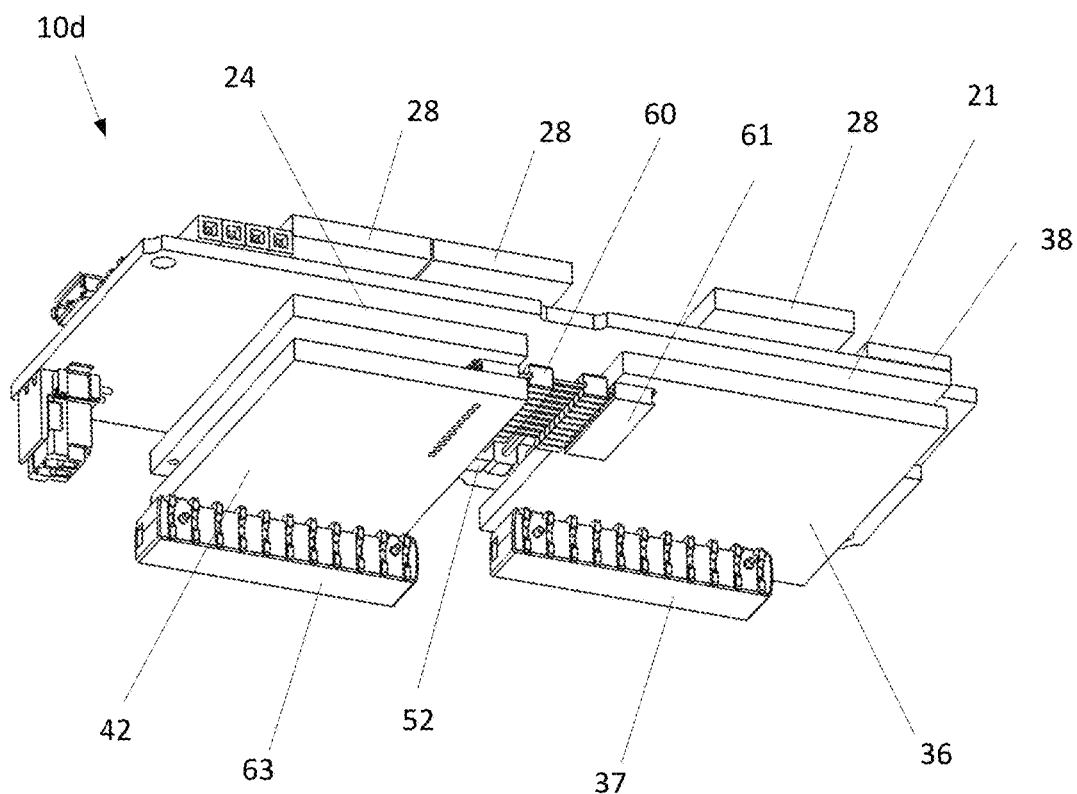
FIG. 5 is a perspective view of a wireless sensor device according to a third exemplary embodiment of the present disclosure, taken from the same perspective as FIG. 4.

FIG. 5 is a third perspective view of the exemplary wireless sensor device 10d. Socket pair 60, 61 provides a releasable connection between the secondary body 24 and the tertiary body 36. The socket 62 (not visible in this view) provides a releasable connection between the secondary body 24 and a second tertiary body 42. The second tertiary body 42 also includes a socket 63 to allow the second tertiary body 42 to interconnect with a tertiary transducer or a tertiary transceiver. The tertiary body 36 is mounted to both the primary body 21 and the secondary body 24.

Figure 6:
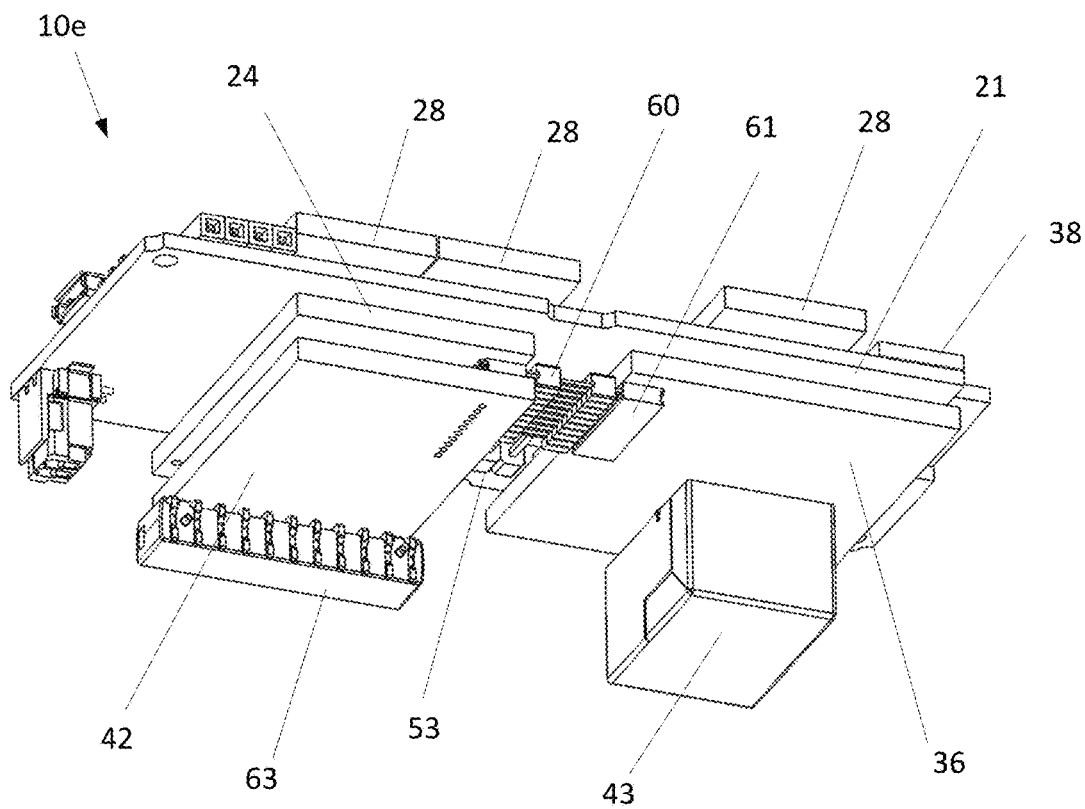
FIG. 6 is a perspective view of a wireless sensor device according to a fourth exemplary embodiment of the present disclosure, taken from the same perspective as FIGS. 4 and 5.

FIG. 6 is a fourth perspective view of the exemplary wireless sensor device 10e. A socket pair 60, 61 provides a releasable connection between the secondary body 24 and the tertiary body 36. A socket 62 (not visible in this view) provides a releasable connection between the secondary body 24 and a second tertiary body 42. A transceiver 43 is mounted on the tertiary body 36 in this embodiment of the present disclosure. It is noted that one or more sockets 63 can be mounted on the tertiary body 42 and can each can provide communication with a tertiary transducer or tertiary transceiver.

Figure 7:
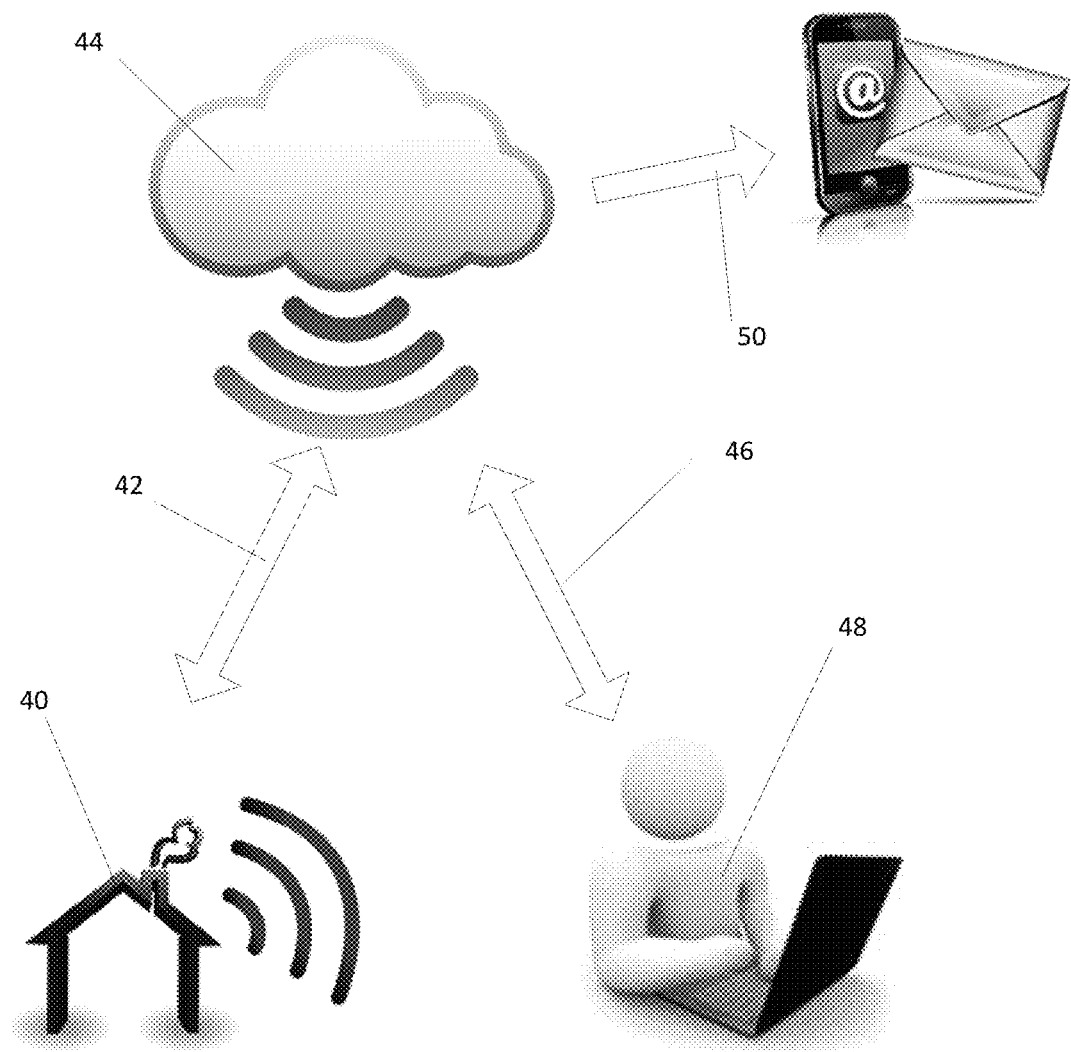
FIG. 7 is a schematic illustration of system incorporating a wireless sensor device according to an exemplary embodiment of the present disclosure.

FIG. 7 is a schematic illustration of system incorporating a wireless sensor device according to an exemplary embodiment of the present disclosure. The object (or person) being monitored is referenced at 40 and comprises an environment with a suite of emplaced wireless sensor devices 10. In an embodiment, a database record may be created that associates a unique identifier associated with each wireless sensor device 10 with the region of environment in which it is emplaced. Each wireless sensor device 10, or network of the same, can communicate with the cloud-based computers 44. The communication 42 may be wireless, using, for example, WiFi or packet radio; wired Ethernet, telephone lines, etc. The cloud-based computers 44 may perform several functions, including storing the data received from the instrumented environment 40, identifying patterns, accepting configuration information 46 from a user 48, and updating the operating parameters of the wireless sensor device 10 emplaced within instrumented environment 40.

When a condition or interest arises, the system may generate an alert 50. Information related to the alert condition may be sent to the user 48 using predetermined forms of communication, e.g., phone, SMS, email, etc.

The system described offers several key benefits that overcome the shortcomings with existing inventions and directly address the previously identified needs.

The system provides a complete architecture that allows users to deploy wireless sensor device 10 and to start receiving information without having to develop and hardware or software. Thus, the utility of the invention is high as it enabled those without significant technical expertise to benefit from the advantages of an IoT system.

The system disclosed is fully modular and allows the user to use a single wireless sensor device 10 to service multiple transducers. In an embodiment, up to 20 transducers can be serviced, but there is fundamental reason why a single wireless sensor device 10 could not service an untold number of transducers. The modularity reduces cost and improves flexibility of the system.

It is noted that embodiments of the present disclosure can be practiced in which a primary body is engaged with more than one secondary body and more than one tertiary body.

The modularity of the disclosed system also allows for the easy addition of additional transceiver, which are typically used to communicate to the cloud. In an embodiment wherein each wireless sensor device 10 includes a radio for forming a mesh network, one or more of said wireless sensor device 10 may include an additional transceiver, thereby obviating the need for a separate gateway to the cloud. In an embodiment, communication with the cloud can be achieved by way of a hard-wire interface between the wireless sensor device 10 and an external computer, wherein said external computer is part of the cloud or has the means to communicate with the cloud.

The modularity further allows for including one or more secondary processors. Since not all IoT applications require a secondary processor, including one in each product produced would unnecessarily raise costs and increase energy consumption. By including a secondary processor in certain wireless sensor device 10, the amount of wireless data transmission can be dramatically reduced.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein as other present disclosures in other patent documents is hereby unconditionally reserved.

What is claimed is:

1. A wireless sensor device comprising:
   a primary body;
   a primary processor mounted to said primary body;
   a first plurality of sockets mounted to said primary body and disposed in electrical communication with said primary processor;
   a secondary body releasibly mounted to said primary body through a first socket of said first plurality of sockets;
   a secondary processor mounted to said secondary body, said primary processor and said secondary processor disposed in electrical communication with one another through said first socket and operating asynchronously;
   a primary transducer releasibly mounted to said primary body and disposed in electrical communication with said primary processor through a second socket of said first plurality of sockets, said primary processor configured to direct the electrical signals generated by said primary transducer to said secondary processor;
   a first wireless transceiver disposed in electrical communication with said primary processor;
   wherein said secondary processor is configured to process the electrical signals generated by said primary transducer independently of said primary processor and selectively communicate output to said primary processor;
   wherein said primary processor is configured to control communications through said first wireless transceiver independently of said secondary processor; and
   a tertiary body in electrical communication with the secondary body.

2. The wireless sensor device of claim 1 wherein said tertiary body further comprises conditioning circuitry configured to interface with one of a rosette of strain gauges and an accelerometer.

3. A wireless sensor device comprising:
   a primary body;
   a primary processor mounted to the primary body;
   a first plurality of sockets mounted to the primary body and disposed in electrical communication with the primary processor;
   a first transducer releasibly mounted to the primary body and can be disposed in electrical communication with the primary processor through a first socket of the first plurality of sockets;
   a secondary body releasibly mounted to the primary body through a second socket of the first plurality of sockets;
   a secondary processor mounted to the secondary body, wherein the primary processor and the secondary processor can be disposed in electrical communication with one another through the second socket and can be operating asynchronously, wherein the primary processor is configured to direct the electrical signals generated by the first transducer to the secondary processor, and wherein the secondary processor is configured to process the electrical signals generated by the first transducer independently of the primary processor and selectively communicate output to the primary processor;
   a second plurality of sockets mounted to the secondary body and disposed in electrical communication with the secondary processor;
   a tertiary body releasibly mounted to the secondary body;
   a tertiary transducer mounted to the tertiary body and can be disposed in electrical communication with the secondary processor through a first socket of the second plurality of sockets; and
   a first wireless transceiver disposed in electrical communication with and controlled by the primary processor and is configured to be selectively controlled by the primary processor independently of the secondary processor.

4. The wireless sensor device of claim 3 further comprising:
   a third plurality of sockets mounted to the tertiary body, the third plurality of sockets placing the tertiary transducer in electrical communication with the at least one of the secondary processor through the one of the second plurality of sockets and the primary processor through the one of the first plurality of sockets.

5. The wireless sensor device of claim 3 wherein the tertiary transducer is further defined as releasibly mounted on the tertiary body.

6. The wireless sensor device of claim 3 wherein the tertiary transducer is further defined as fixedly mounted on the tertiary body.

7. The wireless sensor device of claim 3 further comprising:
a second transducer releasibly mounted to the secondary body and disposed in electrical communication with the secondary processor through one of the second plurality of sockets, whereby electrical signals generated by the second transducer are communicated to the secondary processor.

8. The wireless sensor device of claim 7 wherein the second transducer is further defined as disposed in electrical communication only with the secondary processor.

9. The wireless sensor device of claim 7 wherein:
the primary processor is further defined as configured to convert the electrical signals received from one of the first transducer and the tertiary transducer from analog to digital prior to directing the electrical signals to the secondary processor; and
the secondary processor is further defined as configured to perform processing on the digital electrical signals received from the primary processor and on the digital electrical signals received from the one of the second transducer and the tertiary transducer.

10. The wireless sensor device of claim 3 further comprising:
at least one battery electrically coupled to one of the primary, secondary and tertiary bodies and configured to provide electrical power required by at least one of the primary processor and the secondary processor.

11. The wireless sensor device of claim 10 wherein the at least one battery exclusively provides electrical power required by the primary processor and by the secondary processor.

12. The wireless sensor device of claim 10 wherein the at least one battery is further defined as directly electrically coupled to the primary body and provides electrical power required by the secondary processor through the interconnection between the primary body and the secondary body.

13. The wireless sensor device of claim 3 wherein the secondary processor is further defined as configured to perform stream processing on the electrical signals generated by one of the first transducer and the tertiary transducer.

14. The wireless sensor device of claim 13 wherein the primary processor is further defined as configured to convert the electrical signals received from the one of the first transducer and the tertiary transducer from analog to digital prior to directing the electrical signals generated by the one of the first transducer and the tertiary transducer to the secondary processor.

15. The wireless sensor device of claim 13 wherein the secondary processor is configured for stream processing.

16. The wireless sensor device of claim 3 further comprising:
a second wireless transceiver releasibly mounted to the primary body, the second wireless transceiver disposed in electrical communication with the primary processor through a third socket of the first plurality of sockets, wherein the second wireless transceiver is controllable by the primary processor.

17. The wireless sensor device of claim 16 wherein the second wireless transceiver is further defined as selectively controllable by the primary processor and by the secondary processor.

18. The wireless sensor device of claim 3 wherein the output of the secondary processor is further defined as a numerical value and the primary processor is further defined as configured to selectively transmit the output of the secondary processor through the first wireless transceiver only in response to the numerical value changing a predetermined amount.

19. The wireless sensor device of claim 3 further comprising:
a second tertiary body releasibly mounted to at least one of the secondary body and the primary body; and
a second tertiary transducer mounted to the second tertiary body and disposed in electrical communication with at least one of the primary processor and the secondary processor through one of the second plurality of sockets and the primary processor through one of the first plurality of sockets.

20. The wireless sensor device of claim 3 further comprising:
a second wireless transceiver mounted on the tertiary body and disposed in electrical communication with one of the primary processor and the secondary processor.

21. The wireless sensor device of claim 3 wherein the tertiary transducer is further defined as disposed in electrical communication with the primary processor through one of the first plurality of sockets.

* * * * *